United States Patent
Sarangi et al.

(10) Patent No.: US 10,528,632 B2
(45) Date of Patent: Jan. 7, 2020

(54) SYSTEMS AND METHODS FOR RESPONDING TO AN ONLINE USER QUERY

(71) Applicant: Microsoft Technology Licensing, LLC, Redmond, WA (US)

(72) Inventors: Abinash Sarangi, Redmond, WA (US); Marcelo Debarros, Redmond, WA (US); Rahul Lal, Redmond, WA (US); Alexander Verge, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 640 days.

(21) Appl. No.: 15/214,291

(22) Filed: Jul. 19, 2016

(65) Prior Publication Data
US 2018/0025085 A1    Jan. 25, 2018

(51) Int. Cl.
| | | |
|---|---|---|
| *G06F 17/30* | (2006.01) | |
| *G06F 16/9535* | (2019.01) | |
| *G06F 16/248* | (2019.01) | |
| *G06F 3/0482* | (2013.01) | |
| *H04L 12/58* | (2006.01) | |
| *H04L 29/08* | (2006.01) | |

(52) U.S. Cl.
CPC ........ *G06F 16/9535* (2019.01); *G06F 3/0482* (2013.01); *G06F 16/248* (2019.01); *H04L 51/02* (2013.01); *H04L 51/04* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,285,652 B2 | 10/2012 | Biggs et al. | |
| 8,832,067 B2 | 9/2014 | Atherton et al. | |
| 2005/0102259 A1 | 5/2005 | Kapur | |
| 2008/0004992 A1 | 1/2008 | King et al. | |
| 2009/0281966 A1* | 11/2009 | Biggs .................... | G06F 16/951 706/11 |

(Continued)

OTHER PUBLICATIONS

M, Deirdre, "Virtual Agents: Customer Service Helpers, or Customer Service Disaster?", Published on: Nov. 9, 2015, 5 pages. Available at: http://www.jacquette.com/virtual-agents-customer-service-helpers-or-customer-service-disaster/.

(Continued)

*Primary Examiner* — Anhtai V Tran
(74) *Attorney, Agent, or Firm* — Merchant & Gould P.C.

(57) ABSTRACT

Systems and methods for responding to a user query are provided. More specifically, the systems and methods provide static search results along with a relevant chat bot user interface for combined display on a browser interface in response to a user query. As such, the systems and methods utilize a conversation layer to communicate with a selected chat bot service. Additionally, the systems and methods may update the static search results and other related content displayed in the browser interface in response to user chat bot inputs and/or chat bot responses provided on the chat bot user interface in the combined display. Accordingly, the systems and methods for responding to a user query provide a more efficient and better search engine when compared to previously utilized search engines that did not provide access to a chat bot interface on the same browser interface as the search results.

16 Claims, 15 Drawing Sheets

(56) References Cited

U.S. PATENT DOCUMENTS

| | | | |
|---|---|---|---|
| 2010/0125592 A1* | 5/2010 | Dauginas | G06Q 30/02 707/758 |
| 2011/0208714 A1 | 8/2011 | Soukal et al. | |
| 2011/0252108 A1 | 10/2011 | Morris et al. | |
| 2013/0282702 A1 | 10/2013 | Zhu et al. | |
| 2014/0164953 A1 | 6/2014 | Lynch et al. | |
| 2014/0279050 A1 | 9/2014 | Makar et al. | |
| 2014/0351093 A1 | 11/2014 | Jeremias | |
| 2016/0358240 A1* | 12/2016 | Redfern | G06Q 30/0619 |

OTHER PUBLICATIONS

Bhute, et al., "Intelligent Web Agent for Search Engines", In Proceedings of International Conference on Trends and Advances in Computation and Engineering, Retrieved on: Jun. 29, 2016, 5 pages.

"Virtual Agent for Customer Service & Helpdesk", Retrieved on: Jun. 29, 2016, 22 pages. Available at: http://www.inteliwise.com/en/produkty/virtual-agent-for-customer-service-helpdesk/.

PCT International Search Report and Written Opinion in PCT/US2017/041812, dated Oct. 30, 2017, 25 pages.

Balthaser, "Bots will revolutionize the way we search", Chatbots Magazine, Jun. 8, 2016, 6 pages. [https://chatbotsmagazine.com/bots-will-revolutionize-the-way-we-search-c9c7bde6aded].

"Using 0Auth 2.0 to Access Google APIs", Mar. 21, 2016, 8 pages. [https://web.archive.org/web/20160321094923/https://developers.google.com/identity/protocols/0Auth2].

"What is the Dynamic Phone Launcher? Everything.me Home", Apr. 14, 2013, 1 page. [URL:http://www.youtube.com/watch?v=xz2pD-gRzpY].

* cited by examiner

SYSTEMS AND METHODS FOR RESPONDING TO AN ONLINE USER QUERY

BACKGROUND

Online content searching is a process of searching for and retrieving requested information based on a user query utilizing a search application running on a client computing device, such as a laptop or a smart phone or accessed by a client computing device running over one or more servers. An online search is conducted through one or more search engines, which are programs running on one or more remote servers. The search engines search for documents or website links for specified keywords and return a list of the documents and/or links where the keywords were found and present these result to the user.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for responding to a user query. More specifically, the systems and methods disclosed herein provide static search results along with a relevant chat bot user interface for combined display on a browser interface in response to a user query. As such, the systems and methods as disclosed herein utilize a conversation layer to communicate with chat bot service for a selected chat bot. Additionally, the systems and methods as disclosed herein may update the static search results and other related content displayed in response to user chat bot inputs and/or chat bot responses provided on the chat bot user interface in the combined display. Accordingly, the systems and methods disclosed herein for responding to a user query provide a more efficient and better search or search engine when compared to previously utilized search engines that did not provide access to a chat bot interface on the same browser interface as the static search results.

One aspect of the disclosure is directed to a system for responding to an online search query. The system includes at least one processor and a memory. The memory encodes computer executable instruction that, when executed by the at least one processor, are operative to:
  receive a search query;
  in response to the search query, retrieve static search results from a knowledge backend;
  in response to the search query, compare the search query to a chat bot index;
  determine that a relevant chat bot exists based on the comparison of the search query to the chat bot index;
  in response to the determining that the relevant chat bot exist, retrieve the relevant chat bot;
  communicate with a chat bot service for the relevant chat bot utilizing a conversation layer, wherein the conversation layer communicates with the chat bot service by:
    selecting an appropriate platform schema for communicating with the chat bot service;
    providing the search query to the chat bot service;
    receiving an update for the relevant chat bot from the chat bot service; and
    applying the update to the relevant chat bot to form an updated chat bot;
  render a user interface for the updated chat bot; and
  provide the user interface and the static search results for combined display Yet another aspect of the disclosure includes a method for responding to an online search query. The method includes a computing device. The computing device includes a processing unit and a memory. The processing unit implements a search engine and a conversation layer. The computing device is operable to:
  receive a search query;
  in response to the search query, retrieve static search results from a knowledge backend;
  in response to the search query, compare the search query to a chat bot index;
  determine that a relevant chat bot exists based on the comparison of the search query to the chat bot index;
  in response to the determining that the relevant chat bot exist, retrieve the relevant chat bot;
  communicate with a chat bot service for the relevant chat bot utilizing the conversation layer, wherein the conversation layer communicates with the chat bot service by:
    selecting an appropriate platform schema for communicating with the chat bot service;
  render a user interface for the relevant chat bot; and
  provide the user interface and the static search results for combined display A further aspect of the disclosure includes a method for responding to an online search query. The method includes:
  receiving a search query;
  in response to the search query, retrieving static search results from a knowledge backend;
  in response to the search query, comparing the search query to a chat bot index;
  determining that a relevant chat bot exists based on the comparing of the search query to the chat bot index;
  in response to the determining that the relevant chat bot exist, retrieving the relevant chat bot;
  communicating with a chat bot service for the relevant chat bot utilizing a conversation layer, wherein the conversation layer communicates with the chat bot service by:
    selecting an appropriate platform schema for communicating with the chat bot service,
    providing an appropriate token to the chat bot service,
    providing the search query to the chat bot service,
    receiving an update for the relevant chat bot from the chat bot service, and
    applying the update to the relevant chat bot to form an updated chat bot;
  rendering a user interface for the updated chat bot; and
  providing the user interface and the static search results for combined display.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
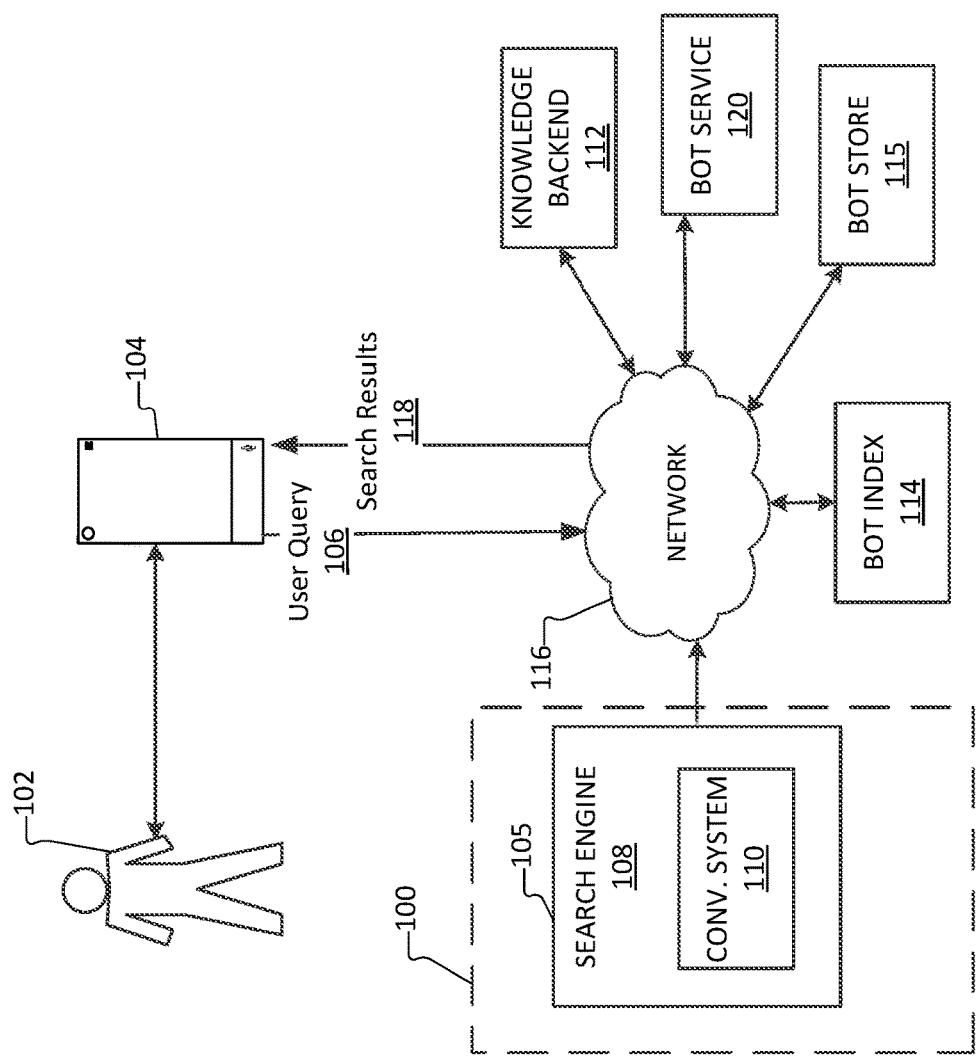
FIG. 1A is a schematic diagram illustrating a system for responding to a user query being utilized by a user via a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Bots are becoming more and more prevalent and are being utilized for more and more different tasks. As understood by those skilled in the art, bots are software applications that may run automated tasks over a network, such as the Internet. Chat bots are designed to conduct a conversation with a user via auditory or visual methods to simulate human conversation. A chat bot may utilize sophisticated natural language processing systems or scan for keywords from a user input and then pull a reply with the most matching keywords or the most similar wording pattern from a database. Chat bots are often utilized for customer service or information acquisition. As chat bots advance, they become more and more relevant to a user online search.

As discussed above, search engines search for documents or website links based on specified keywords form a user query and return a list of the documents and/or links where the keywords were found and present these result to the user. The listing of documents and/or links is referred to herein as static search results. Some previously utilized search engines have provided links to any relevant chat bots found by a search engine based on the search query. The links are provided because the search engine is not capable of direct communication with the chat bot and allows the user to engage the chat bot on a separate page. As such, there is typically no system or method for providing a combined display of the static search results and a user interface for a determined relevant chat bot by a search engine. Additionally, there is typically no system or method for updating the static search results and/or any related displayed content based on user chat bot inputs and/or chat bot responses.

The systems and method as disclosed herein are directed to system and method for responding to a user query. The systems and methods as disclosed herein provide static search results along with a relevant chat bot user interface for combined display in response to a user query. Accordingly, the systems and methods as disclosed herein utilize a conversation layer to communicate with a selected chat bot. Additionally, the systems and methods as disclosed herein may update the static search results and other related content displayed in response to user chat bot inputs and/or chat bot responses provided on the chat bot user interface in the combined display.

The ability of the systems and methods described herein to provide a combined display of static search results and a chat bot user interface in response to a user query provides for a better, more efficient, and easier to use search engine when compared to previously utilized search engines that did not provide combined display. Additionally, the ability of the systems and methods described herein to update the static search results and/or other displayed content in response to user chat bot inputs and/or chat bot responses provides for a better, more efficient, and easier to use search engine when compared to previously utilized search engines that did not provide the ability to updated these contents in response to chat bot inputs and/or chat bot responses.

Figure 1B:
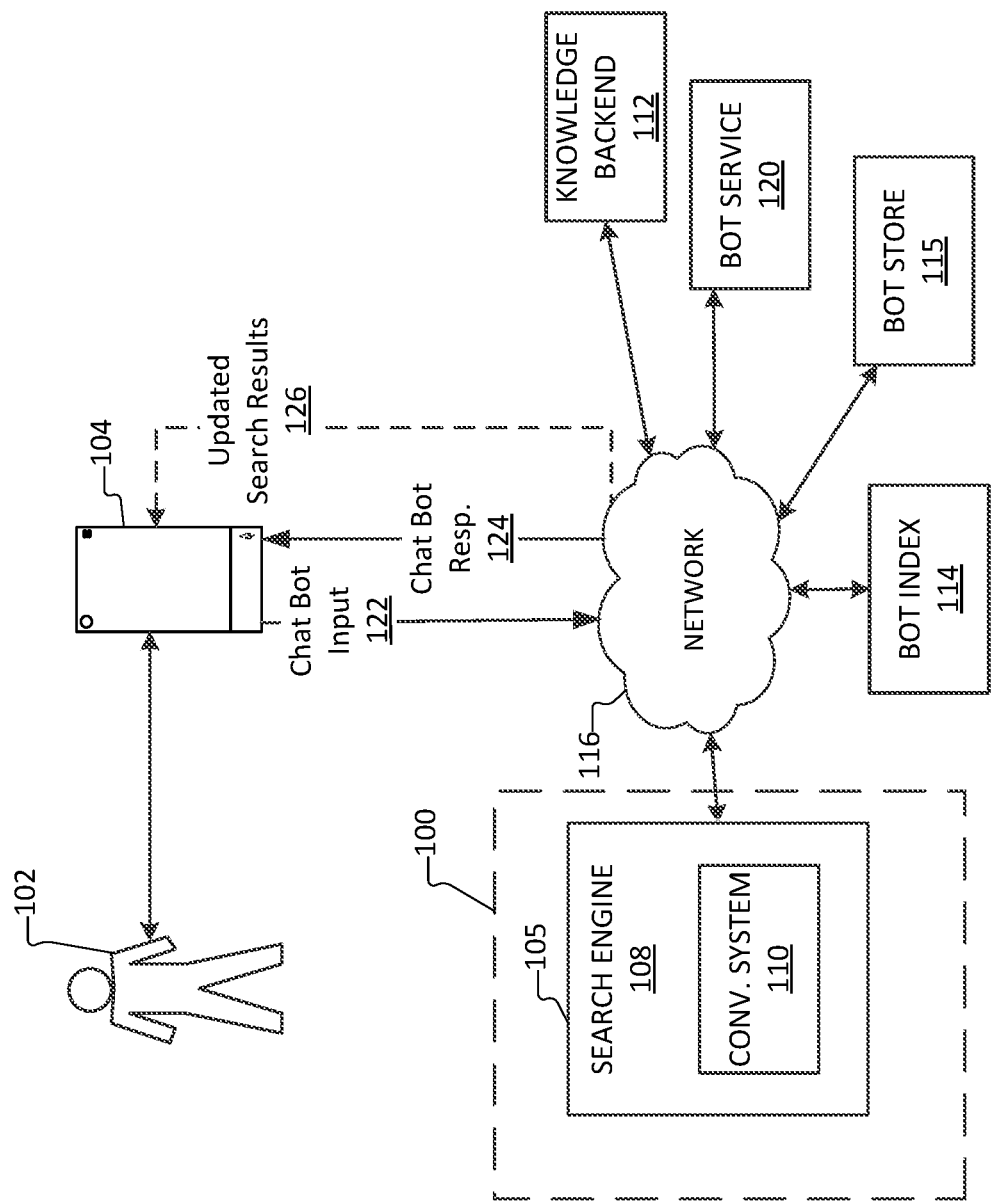
FIG. 1B is a schematic diagram illustrating a system for responding to user bot input being utilized by the user via the client computing device after responding to the user query as illustrated in FIG. 1A, in accordance with aspects of the disclosure.
Figure 1C:
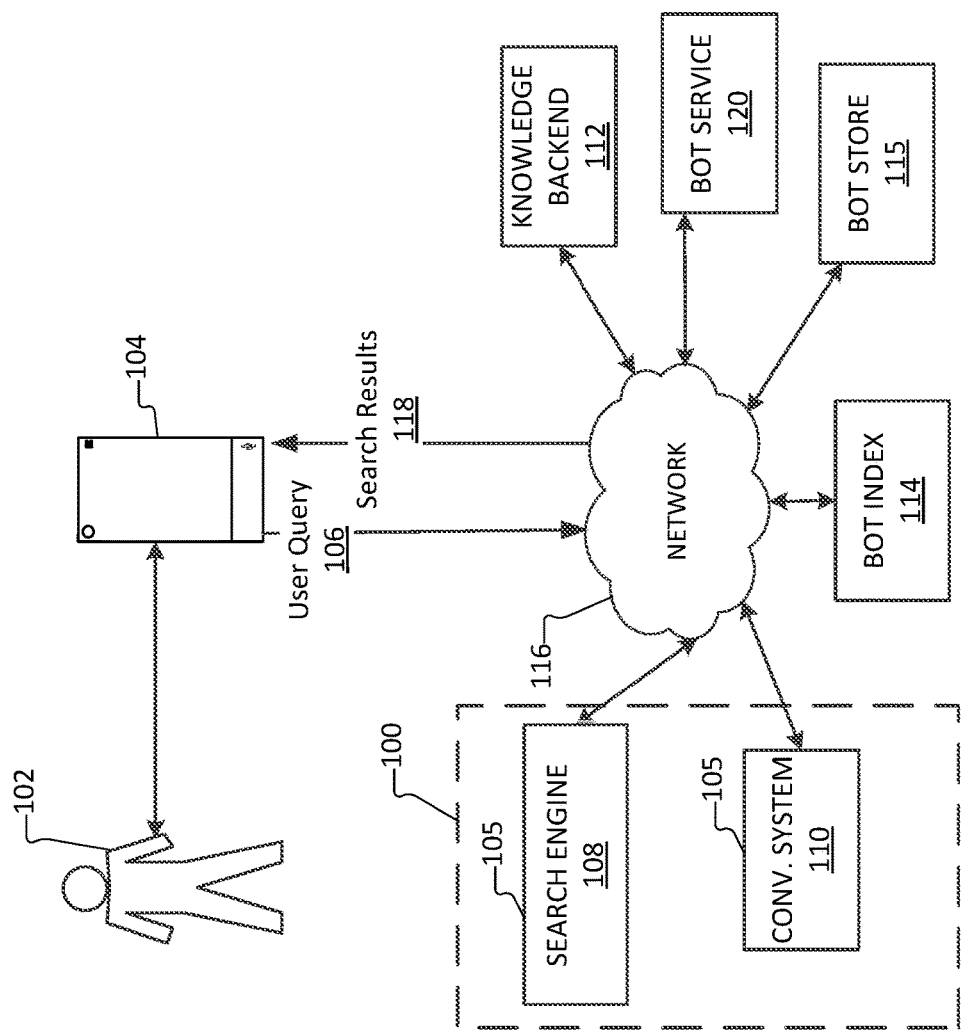
FIG. 1C is a schematic diagram illustrating a system for responding to a user query being utilized by a user via a client computing device, in accordance with aspects of the disclosure.
Figure 1D:
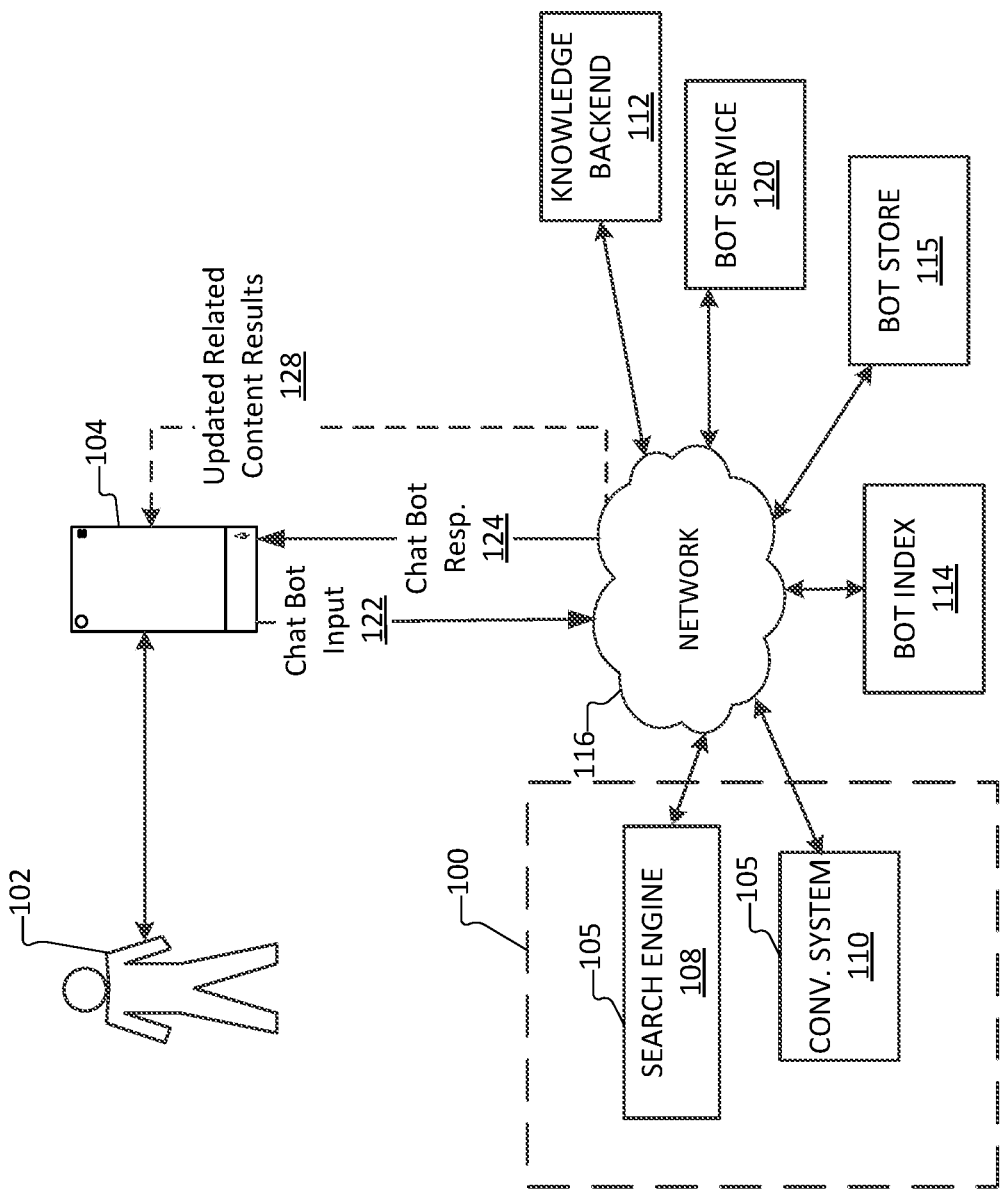
FIG. 1D is a schematic diagram illustrating a system for responding to user bot input being utilized by the user via the client computing device after responding to the user query as illustrated in FIG. 1C, in accordance with aspects of the disclosure.

FIGS. 1A-1E illustrate different examples of a system 100 for responding to a user query 106 being utilized by a user 102 via a client computing device 104, in accordance with aspects of the disclosure. FIGS. 2A and 2B illustrate a communication flow diagram 200 between the different components of system 100 and other external components in order to respond to a user query by system 100. The system 100 is capable providing static search results along with a user interface for a relevant bot for display in response to a user query 106. The system 100 may also be capable of updating the static search results and/or other displayed content in response to a user bot input and/or a chat bot response. The system 100 includes a search engine 108 and a conversation layer 110. Accordingly, the search engine 108 and the conversation layer 110 communicate between each other. In some aspects, the system 100 also includes a bot index 114, a bot store 115, and/or a knowledge backend 112. Accordingly, the search engine 108, the conversation layer 110, the bot index 114, the bot store 115, and/or the knowledge backend 112 may communicate between each other.

Figure 1E:
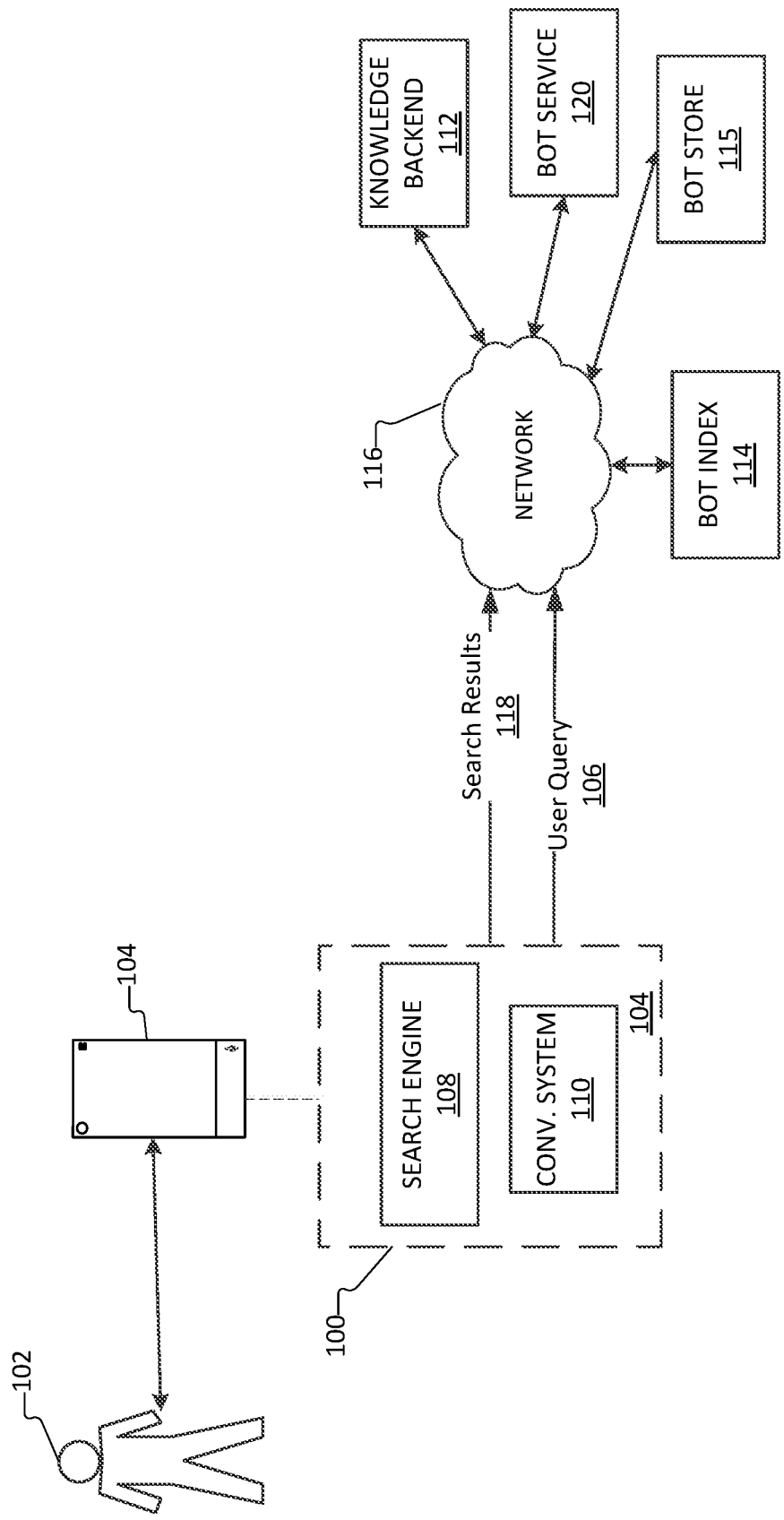
FIG. 1E is a schematic diagram illustrating a system for responding to a user query being utilized by a user, in accordance with aspects of the disclosure.
Figure 2A:
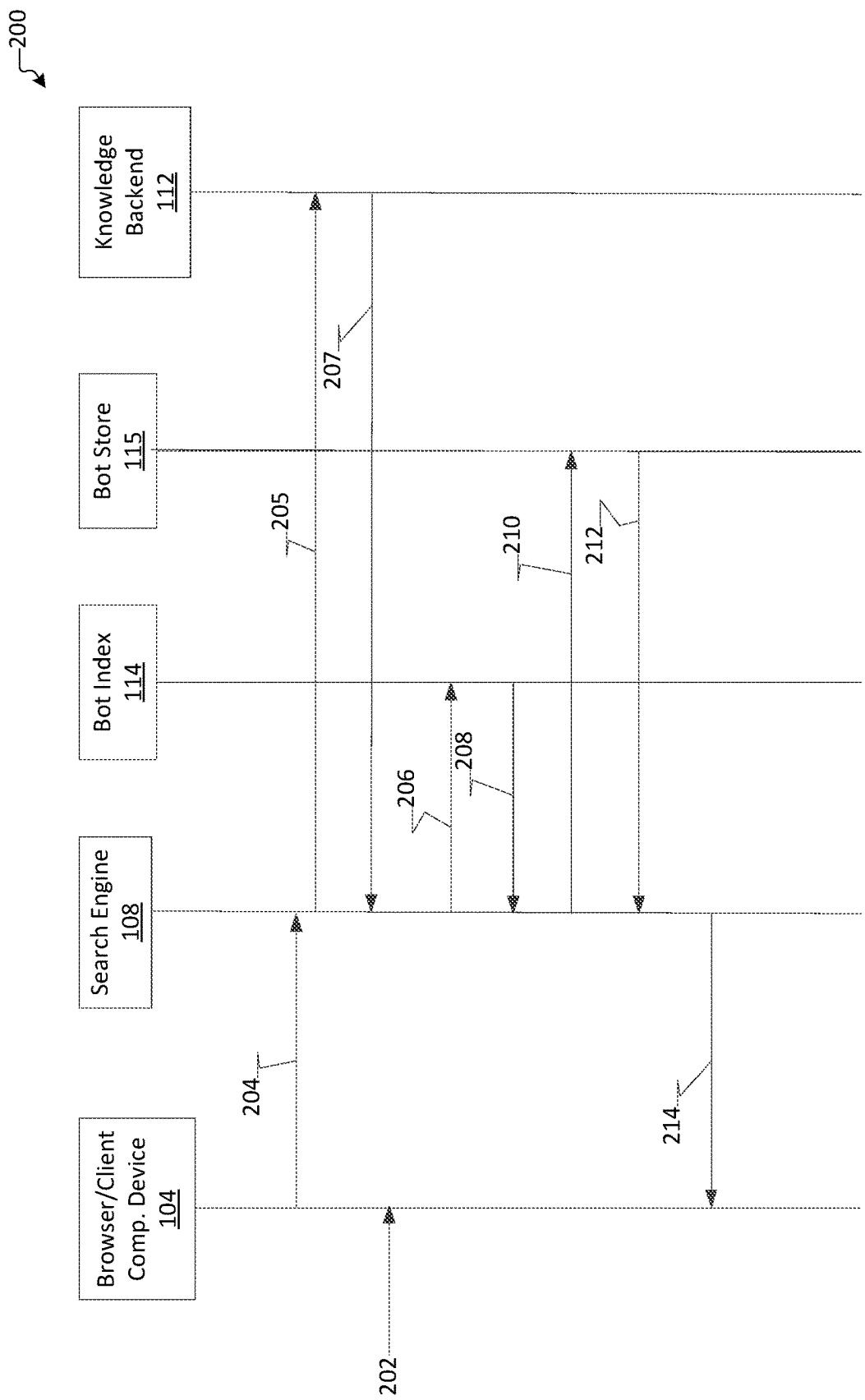
FIG. 2A is a schematic diagram illustrating communication flow between a system for responding to a user query and other external components for responding to a user query, in accordance with aspects of the disclosure.
Figure 2B:
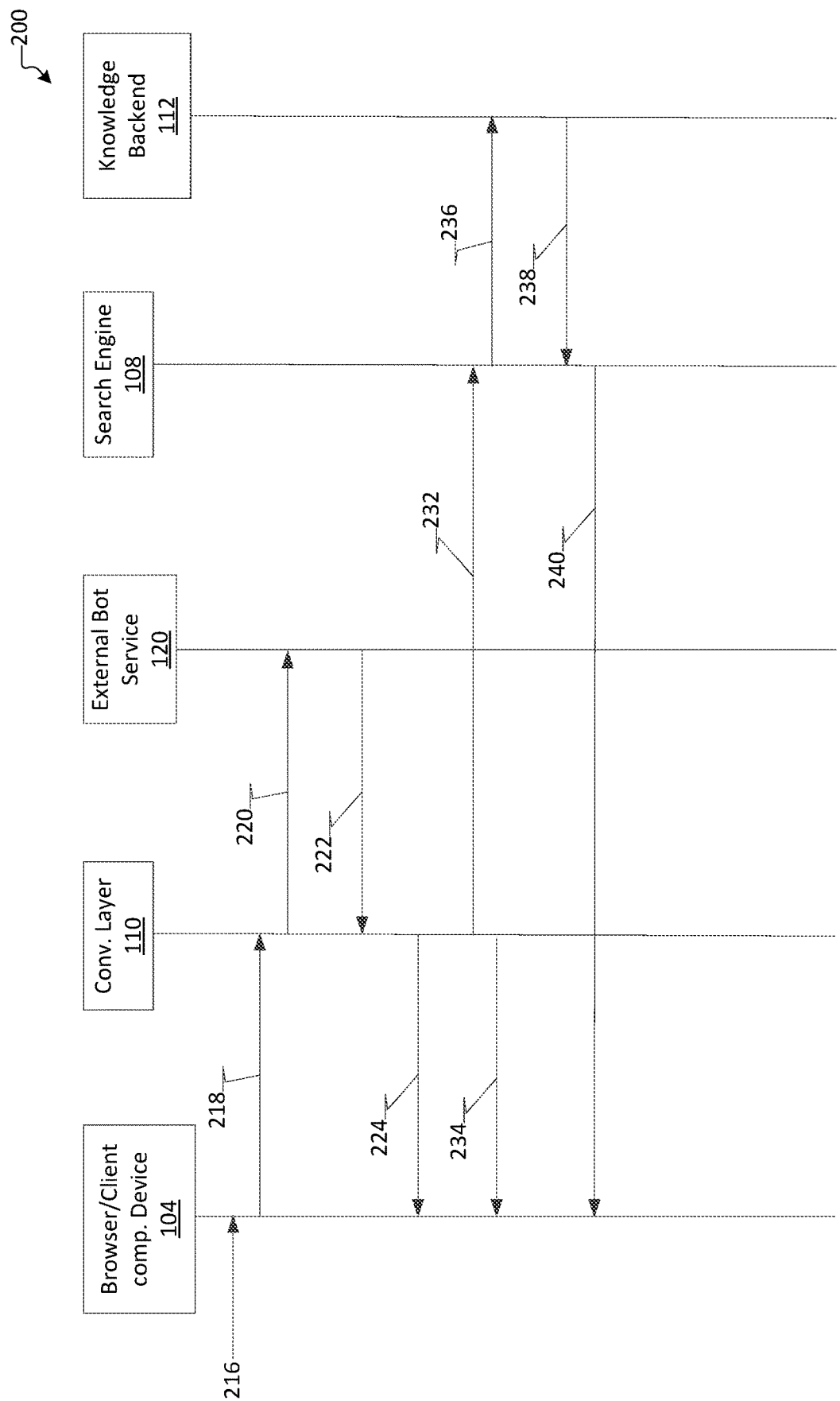
FIG. 2B is a schematic diagram illustrating communication flow between a system for responding to a user query and other external components for responding to a user bot input after responding to the user query in FIG. 2A, in accordance with aspects of the disclosure.

In some aspects, the system 100 is implemented on the client computing device 104 as illustrated by FIG. 1E. In a basic configuration, the client computing device 104 is a computer having both input elements and output elements. The client computing device 104 may be any suitable computing device for implementing the system 100. For example, the client computing device 104 may be a mobile telephone, a smart phone, a tablet, a phablet, a smart watch, a wearable computer, a personal computer, a gaming system, a desktop computer, a laptop computer, and/or etc. This list is exemplary only and should not be considered as limiting. Any suitable client computing device 104 for implementing the system 100 or for displaying static search results combined with a chat bot user interface as provided by system 100 may be utilized.

In other aspects, the system 100 is implemented on a server computing device 105, as illustrated in FIGS. 1A and 1B. The server computing device 105 may provide data to and/or receive data from the client computing device 104 through a network 116. In some aspects, the network 116 is a distributed computing network, such as the internet. In further aspects, that system 100 is implemented on more than one server computing device 105, such as a plurality or network of server computing devices 105 as illustrated in FIGS. 1C and 1D. For example, the search engine 108 may be located on the same server 105 as the conversation layer as illustrated in FIGS. 1A and 1B or may be located on separate servers 105 as illustrated in FIGS. 1C and 1D. In some aspects, the system 100 is a hybrid system with portions of the system 100 on the client computing device 104 and with portions of the system 100 on one or more server computing devices 105.

Figure 3:
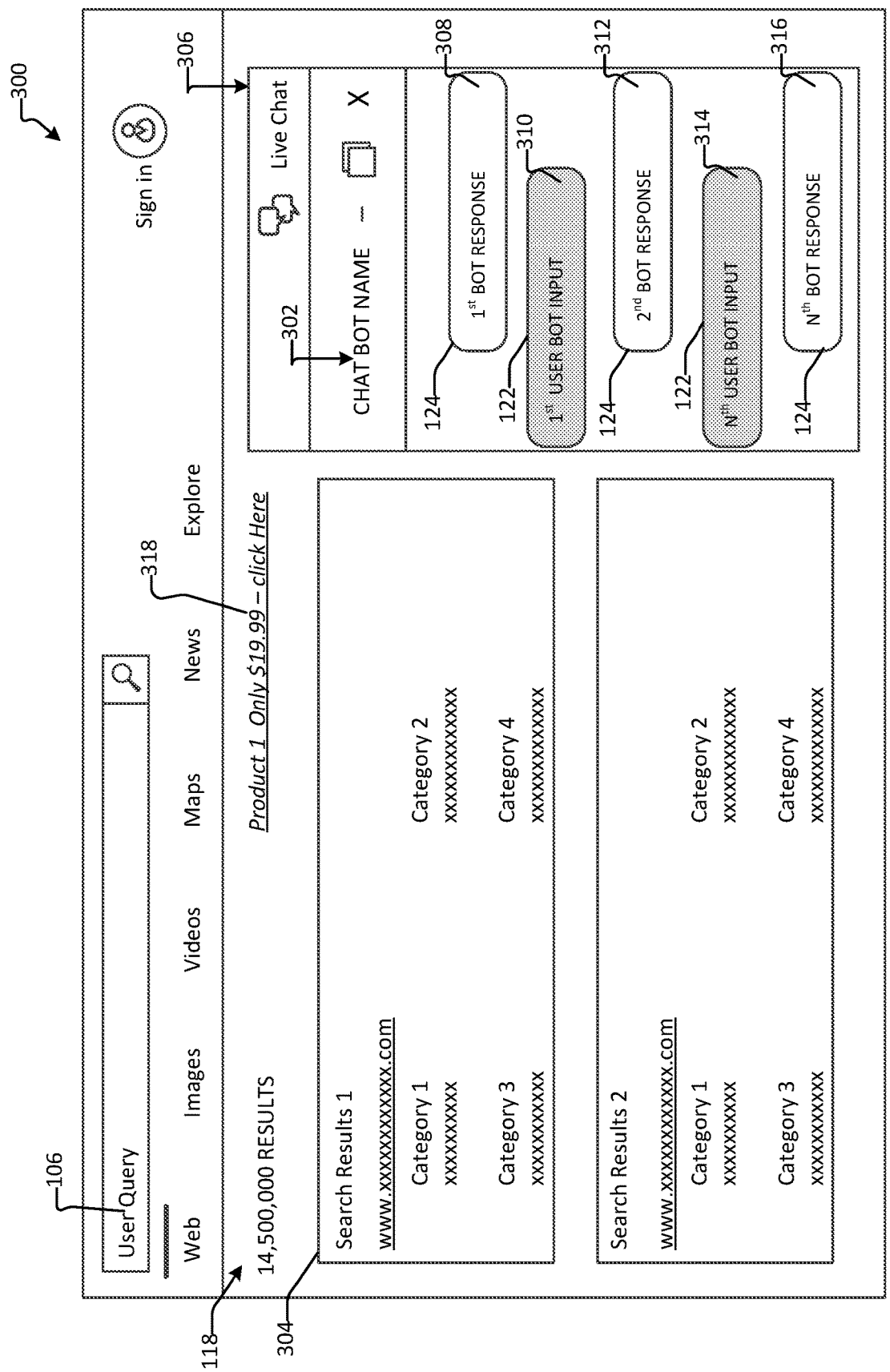
FIG. 3 is schematic diagram illustrating a screen shot of the combined display of a chat bot user interface for a chat bot and static search results as provided by a system for responding to a user query, in accordance with aspects of the disclosure.

FIG. 3 shows an example a browser interface 300 for the system 100. The system 100 provides a browser interface 300 for receiving user queries 106 and for providing search results 118 to the user queries 106. The search results 118 include any found static search results and the user interface for any found relevant chat bot. As such, if the static search results and/or a relevant chat bot are not found, then the search results 118 will not include any static search results and/or any user interface 306 for a relevant chat bot 302. The browser interface 300 is generated by the system 100 and presented to the user 102 via the client computing device 104. The browser interface 300 of the system 100 allows the user 102 to input a search query 106 and/or a chat bot input 122 for processing by system 100. The client computing device 104 may have one or more input devices, such as a keyboard, a mouse, a pen, a microphone or other sound or voice input device, a touch or swipe input device, etc. for allowing the user 102 to provide the search query 106 and/or chat bot inputs 122 via the browser interface 300. The aforementioned devices are examples and others may be used. The browser interface 300 receipt of the user search query 106 is illustrated by communication flow 202 in FIG. 2A. The browser interface 300 as illustrated in FIG. 3 is exemplary only and is not meant to be limiting. System 100 may provide any suitable browser interface 300 for responding to a user query 106, presenting search results 118, and/or for responding to chat bot inputs 122. The browser interface 300 will be discussed in more detail below.

In some aspects, the user 102 provides a user desired search or query 106 to the system 100 via the client computing device 104 and/or the provided browser interface 300. The client computing device 104 receipt of the user search query 106 is illustrated by communication flow 202 in FIG. 2A. The system 100 receives the search query 106, which includes the search engine 108 and the conversation layer 110. The search engine's 108 receipt of the user search query 106 is illustrated by communication flow 204 in FIG. 2A. The search engine' 108 of system 100 retrieves static search results from a knowledge backend 112 based on the received user query 106 and is illustrated by communication flows 205 and 207 in FIG. 2A.

Additionally, the search engine 108 of system 100 compares the search query 106 to a chat bot index 114 to determine if any relevant chat bots exist for the query 106, as illustrated by communication flows 206 and 208 in FIG. 2A. If the search engine 108 does not find a relevant chat bot based on the comparison, the search engine 108 of system 100 does not retrieve any chat bots. If the search engine 108 finds one or more relevant chat bots based on the comparison, the search engine 108 of system 100 retrieves the one or more relevant chat bots from a bot store 115, as illustrated by communication flows 210 and 212 in FIG. 2A. In some aspects, the search engine retrieves an ID or identification with meta data for the relevant chat bot from the chat bot store 115 over communication flow 212. In some aspects, the search engine 108 only retrieves the most relevant chat bot. In alternative aspects, the search engine 108 retrieves any chat bot that breaches a relevance threshold. In other aspects, the search engine 108 retrieves any chat bot the breaches a relevance threshold up to a predetermined maximum number of chat bots, excluding the least relevant chat bots. The bot store 115 and the bot index 114 may be located on the same server. In some aspects, the bot store 115 and the bot index 114 are the same component. Alternatively, the bot store 115 and the bot index 114 may be located on separate servers 105 as illustrated in FIGS. 1A-1D. The system 100, such as the search engine 108 and/or conversation layer 110, is able to determine the html code and render a user interface (or UX) from the received ID and metadata for the relevant chat bot.

In response to retrieving a relevant chat bot, the conversation layer 110 of system 100 analyzes the relevant chat bot to determine an appropriate platform schema for communicating with chat bot service 120 of the relevant chat bot. Bots may be provided and/or serviced by many different providers, such as Facebook, Slack, Telegram, and etc. This list of bot provider and/or servicers is exemplary only and is not meant be limiting. In alternative aspects, the conversation layer 110 determines the appropriate platform schema for a relevant chat bot based on information retrieved from the bot index 114. For example, the appropriate platform schema may be a Facebook platform schema, slack platform schema, a telegram platform schema, and etc. This list is exemplary only and is not meant to be limiting. Once an appropriate schema has been determined, the conversation layer 110 utilizes the appropriate platform schema to communicate with the chat bot service 120. In further aspects, the conversation layer 110 also determines and provides an appropriate token to the chat bot service 120 in order to communicate with the chat bot service. In some aspects, the conversation layer 110 provides the search query 106 to the chat bot service 120. In further aspects, the conversation layer parses the user query 106 before providing the query 106 to the chat bot service 120. The chat bot service 120 runs the chat bot based on the user query 106 to form an updated chat bot (or a chat bot with a response provided based on the user query). The chat bot service 120 sends the updated chat bot to the conversation layer 110. The conversation layer 110 applies the updated chat bot to the retrieved chat bot.

In some aspects, once the chat bot has been updated, system 100 renders a user interface 306 for the updated chat bot. The system 100 provides the user interface 306 and the static search result for combined display on the browser interface 300 by the client computing device 104. As such, system 100 may send the UX, ID, and metadata along with the static search results to the browser interface 300 and/or the client computing device 104 as illustrated in FIG. 2A by communication flow 214. In other words, system 100 provides the search results 118 to the client computing device 104.

If a user interface for a chat bot is provided, the user 102 may provide a chat bot input 122 into the user interface 306 of the chat bot to request a chat bot response 124 on the browser interface 300 via the client computing device 104 as illustrated by communication flow 216 in FIG. 2B. The user chat bot input 122 is received by system 100, which includes the search engine 108 and conversation layer 110, as illustrated by communication flow 218 in FIG. 2A. The conversation layer 110 communicates the chat bot input 122 to the chat bot service 120 utilizing the selected platform schema and may request a response from the chat bot service 120 as illustrated by communication flow 220 in FIG. 2A. The conversation layer 110 may parse the user bot input 122 before providing the input to the bot service 120. The conversation layer 110 of system 100 receives the chat bot response 124 from the bot service over the selected platform schema as illustrated by communication flow 222 in FIG. 2B. The conversation layer 110 provides the chat bot response 124 to the client computing device 104 for display in the user interface 306 of the chat bot on the browser interface 300 with static search results as illustrated by communication flow 224 in FIG. 2B.

In some aspects, the system 100 compares a received user chat bot input 122 and/or a received chat bot response to an update threshold to determine if the system 100 should update the static search results and/or the other related content displayed on the web browser. The other displayed related content 318, may be content determined by the search engine to be relevant to the user based on known data. In some aspects, the other related content 318 includes advertisements or marketing materials. In further aspects, the other related content 318 is user context information, such as information relating the schedule, environment, work, social media and/or etc. of the user 102. In some aspects, the conversation layer 110 sends the received chat bot input 122 and/or the received chat bot response 124 to the search engine for performing this comparison as illustrated by communication flow 232 on FIG. 2B.

The update threshold may be the same for both the static search results and the other displayed related content. Alternatively, the update threshold may be different for the static search results and the other displayed related content. For example, the update threshold may be higher for the static search results than the other displayed related content. In other aspects, the update threshold may be completely different tests for the static search results and the other displayed related content.

In some aspects, the update threshold is a predetermined percentage change in the static search results or other displayed content. For example, if the user bot input 122 and/or the chat bot response would alter or change over 30% of the current static search results, the system 100 would determine that the user bot input 122 and/or the chat bot response 124 breach the update threshold. The 30% update threshold is exemplary only and is not meant to be limiting. As understood by a person of skill in the art any desired percentage may be utilized as the update threshold. Further, as understood by a person of skill in the art any suitable update threshold for determining when to update the static search results based on the received user chat bot input 122 and/or a received chat bot response 124 may be utilized by system 100. In some aspects, system 100 compares a plurality of user chat bot inputs 122 and/or chat bot response 124 as accumulated to the update threshold.

If system 100 determines that the update threshold is breached for the static search results based on the comparison, the search engine 108 retrieves updated search results based on the one or more user chat bot inputs 122 and the one or more chat bot responses 124 as illustrated by communication flows 236 and 238 on FIG. 2B. The updated search results are provided by system 100 for display on the browser interface 300 alongside the user interface 306 of the relevant chat bot being utilized by the user 102 on the browser interface 300 as illustrated by communication flow 240 on FIG. 2B. If system 100 determines that the update threshold is not breached for the static search results based on the comparison, the search engine 108 does not update the currently displayed static search results.

If system 100 determines that the update threshold is breached for the other displayed related content 318 based on the comparison, the search engine 108 retrieves updated related content 128 based on the one or more user chat bot inputs 122 and the one or more chat bot responses 124. The updated related content 128 is provided by system 100 for display on the browser interface 300 alongside the user interface 306 of the relevant chat bot being utilized by the user 102 and the static search results on the browser interface 300. If system 100 determines that the update threshold is not breached for the other displayed related content 318 based on the comparison, the search engine 108 does not update the currently displayed related content 318 displayed on the browser interface 300.

As discussed above, FIG. 3 shows the browser interface 300 generated by the system 100 in response to a user query 106. In this example, the browser interface 300 displays the search results 118 provided by system 100 in response to an entered user query 106. The search results 118 include static search results 304 and a user interface 306 for a relevant chat bot 302. The browser interface 300 also includes other related content 318. In this aspect, the other related content is an advertisement for a product.

As discussed above, the chat bot 302 has been updated based on the user query 106. As such, the user interface 306 of the chat bot 302 upon initial display on the browser interface 300 may already include a chat bot response 124 (i.e., first chat bot response 308). As also discussed above, the user 102 may engage or utilize the chat bot 302 without ever leaving the browser interface 300. For example, the user 102 may provide a chat bot input 122 into the user interface 306 of the chat bot 302 as displayed on the browser interface 300. As outlined above, the system 100 receives the user chat bot input 122 and utilizes the conversation layer 110 to communicate the user chat bot input 122 to the chat bot service 120. The received chat bot response 124 (i.e., the second chat bot response 312) from the external bot service 120 based on the first user bot input 310 is displayed on the user interface 306 of the chat bot 302 on the browser interface. The user 102 may provide any number of additional user bot inputs 122 (i.e., $N^{th}$ user bot input 314) into the user interface 306 of the chat bot 302 and the system 100 will provide the chat bot responses 124 (i.e., $N^{th}$ chat bot response 316) on the user interface 306 of the chat bot 302 while being displayed with static search results 304 on the browser interface 300. As such, the user 102 does not have to leave the browser interface 300 in order to utilize the chat bot 302.

Figure 4A:
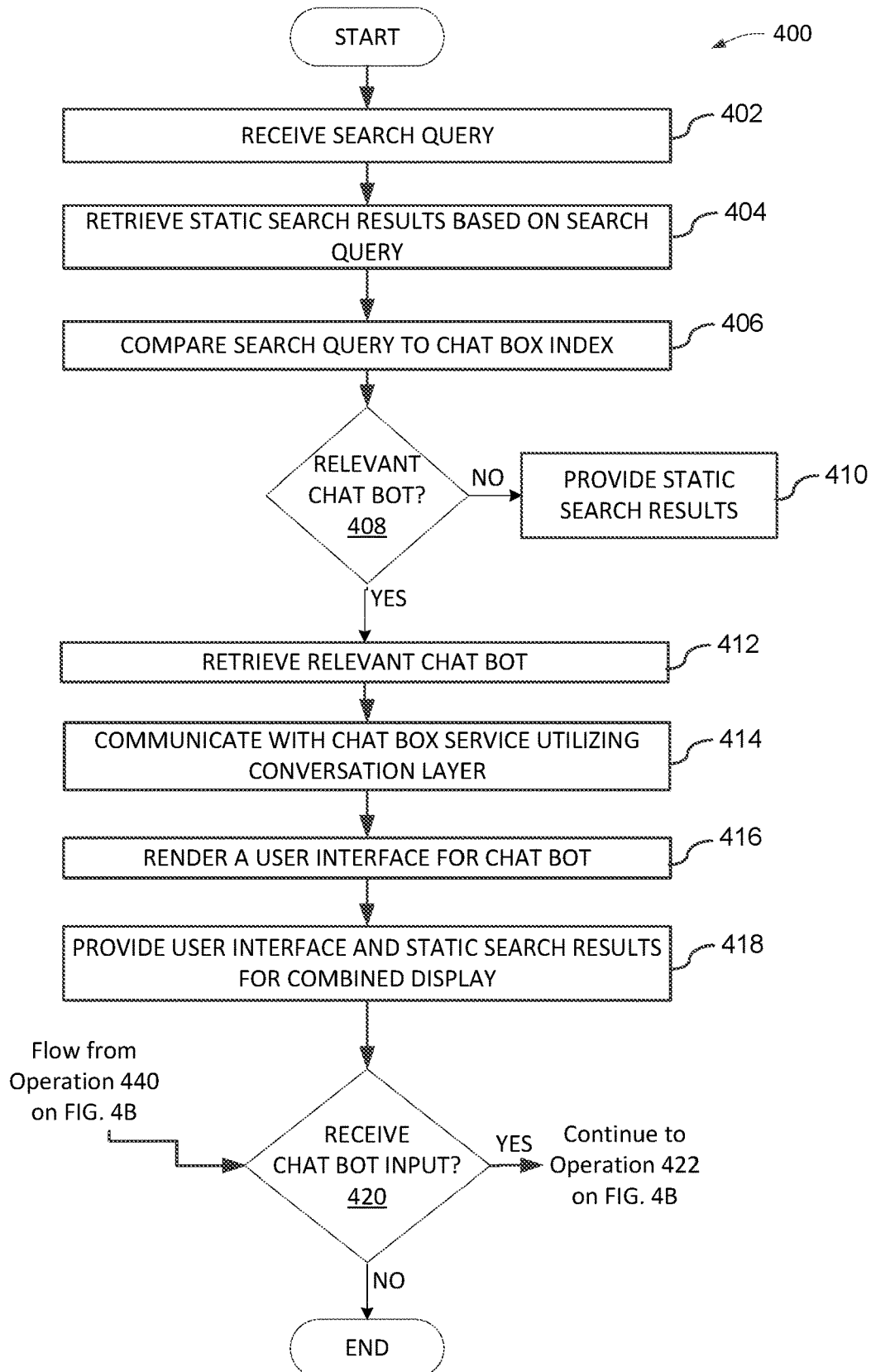
FIG. 4A is block flow diagram illustrating a method for responding to user query, in accordance with aspects of the disclosure.
Figure 4B:
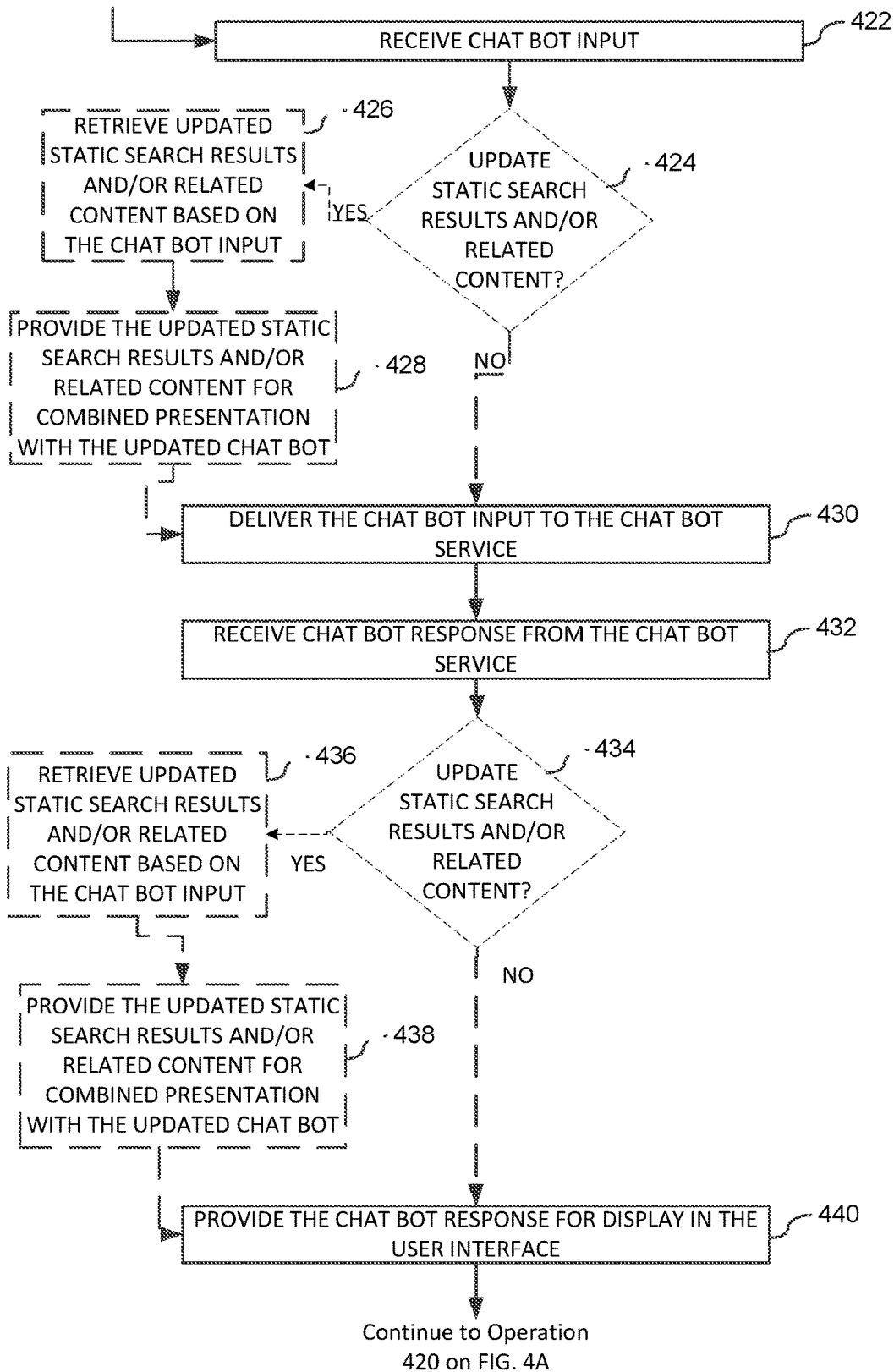
FIG. 4B is block flow diagram illustrating a continuation of the method for responding to user query as shown in FIG. 4A, in accordance with aspects of the disclosure.

FIGS. 4A and 4B illustrate a flow diagram conceptually illustrating an example of a method 400 for responding to a user search query. In some aspects, method 400 is performed by the system 100 including a search engine 108 and a conversation layer 110 as described above. Method 400 is a method for responding to a user query that provides both static search results and a user interface of a relevant chat bot based on the user query. More specifically, method 400 allows the user to interact with a user interface of the chat bot without having to leave the browser interface that also provides the static search results. In further aspects, method 400 is capable of updating the static search results and/or other displayed related content on the browser interface based on the user chat bot input and/or the chat bot response.

Method 400 starts at operation 402. At operation 402, a search query is received from a user and/or client computing device. At operation 404, static search results are retrieved from a knowledge backend based on the received search query and in response to receiving the search query at operation 402.

At operation 406 the search query is compared to a chat bot index in response to receiving the search query at operation 402. At operation 408, method 400 determines if a relevant chat bot exist or is listed in the chat bot index based on a result of the comparison. For example, a relevant chat bot may be determined at operation 408 by matching keywords from the search query to a chat bot listed in the chat bot index. If a relevant chat bot is not found at operation 408, operation 410 is performed. The static search results retrieved during operation 404 are provided to the browser and/or client device for display at operation 410. However, at operation 410 no chat bot or user interface for a chat bot is provided to the browser interface. If a relevant chat bot is found at operation 408, operation 412 is performed. At operation 412 the relevant chat bot is retrieved. In some aspects, the relevant chat bot is retrieved from the chat bot index and/or a chat bot store.

At operation 414 a conversation layer is utilized to communicate with the chat bot service of the relevant chat bot. At operation 414, an appropriate platform schema for communicating with the chat bot service is selected. In some aspects, the conversation layer selects a platform schema for the relevant chat bot based on information from chat bot index and/or from the chat bot store. In other aspects, the conversation layer includes a store of appropriate schemas and parameters for matching a stored schema to a relevant chat bot.

In some aspects, at operation 414, an appropriate token is provided to the chat bot service. In some aspects, the chat bot service will not communicate with the conversation layer unless, the conversation layer is able to provide the appropriate token. In further aspects, the conversation layer may determine the appropriate token based on information received from the bot index and/or the bot store. In other aspects, the conversation layer may determine the appropriate token based on the selected or the appropriate platform schema.

In further aspects, at operation 414, the search query is provided to the chat bot service. The chat bot service is communicated with by utilizing the appropriate platform schema at operation 414. In some aspects, the conversation layer parses the user query before providing the user query to the chat bot service. In some aspects, the conversation layer requests a response to the user query from the chat bot service at operation 414. After the search query is provided to the chat bot operation at operation 414, an update for the relevant chat bot may be received from the chat bot service. The response may be based on the delivered request and/or the user query provided by the conversation layer to the chat bot service. Next, at operation 414 the update to the relevant chat bot may be applied to the relevant chat bot to form an updated chat bot.

At operation 416 the user interface for the relevant chat bot is rendered. At operation 418 the user interface and the static search results are provided to the client computing device and/or the browser interface for combined display. In some aspects, the user interface of the chat bot will include a chat bot response based on the user search query when displayed on the browser interface along with the static search results based on the update received during operation 414.

Once the user interface for the chat bot has been displayed on the browser interface, the user may provide a chat bot input into the user interface of the chat bot on the browser interface. In other words, the user may interact with the chat bot without having to leave the browser interface. However, the user may choose to ignore the provided chat bot.

As such, operation 420 determines whether or not a chat bot input from a user is received. If a chat bot input is not received at operation 420, method 400 ends. In an alternative aspect, if a chat bot input is not received at operation 420, method 400 determines if another user query is received. In these aspects, if another user query is received, flow continues back to operation 402. In these aspects, if another user query is not received, then method 400 ends. If a chat bot input is received at operation 420, operation 422 is performed. At operation 422 the chat bot input is received as illustrated in FIG. 4B.

In some aspect, method 400 performs operations 424, 426, and 428. In other aspects, method 400 does not perform operations 424, 426, and 428.

At operation 424, the chat bot input is compared to an update threshold to determine if the static search results and/or other related content displayed on the browser interface should be updated based on the user provided chat bot input. If operation 424 determines that the update threshold has not been breached, operation 424 determines that static search results and/or the other content should not be updated and flow continues to operation 430. If operation 424 determines the update threshold has been breached based on the chat bot input, operation 424 determines that the static search results and/or the other related content should be updated and flow continues to operation 426.

At operation 426, the updated static search results and/or updated related content is retrieved based on the chat bot input. In some aspect, the search engine searches a knowledge backend for static search results and/or related content based on the chat bot input. Next, the updated static search results and/or the updated related content by the search engine are provided for display at operation 428. In some aspects, the updated search results and/or the updated other related content is provided to the client computing device for display on the browser interface with the chat bot at operation 428. In some aspects, the previously provided static search results are removed from the browser interface at operation 428. In other aspects, the previously provided static search results are moved down the browser interface and displayed below the updated static search results.

At operation 430 the chat bot input is delivered to the chat bot service. In some aspects, the chat bot response is parsed before delivery to the chat bot service at operation 430. In further aspects, the chat bot response is communicated or delivered to the chat bot service utilizing an appropriate platform schema by the conversation layer at operation 430. The conversation lay may request a response to the chat bot input from the chat bot service at operation 430.

Next, a chat bot response is received from the chat bot service at operation 432. In some aspects, the chat bot response is communicated via the conversation layer utilizing the appropriate platform schema.

In some aspect, method 400 performs operations 434, 436, and 438. In other aspects, method 400 does not perform operations 434, 436, and 438.

At operation 434 the chat bot response is compared to an update threshold to determine if the static search results and/or other related content displayed on the browser interface should be updated based on the chat bot response. If operation 434 determines the update threshold has not been breached, operation 434 determines that static search results and/or the other content should not be updated and flow continues to operation 440. If operation 434 determines that the update threshold has been breached based on the chat bot response, operation 434 determines that the static search results and/or the other related content should be updated and flow continues to operation 436.

At operation 436 the updated static search results and/or updated related content is retrieved based on the chat bot response. In some aspect, the search engine searches a knowledge backend for static search results and/or related content based on the chat bot response. Next, the updated static search results and/or the updated related content is provided for display at operation 438. In some aspects, the updated search results and/or the updated other related content is provided to the client computing device for display on the browser interface with the user interface of the chat bot at operation 438. In some aspects, the previously provided static search results are removed from the browser interface at operation 438. In other aspects, the previously provided static search results are moved down the browser interface and displayed below the updated static search results at operation 438.

At operation 440, the chat bot response is provided for display on the user interface of the chat bot. The response is displayed on the browser interface with the static search results and/or the updated static search results. Accordingly, the user does not have to leave the browser interface to interact with the relevant bot during method 400. Next, operation 420 is performed again.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
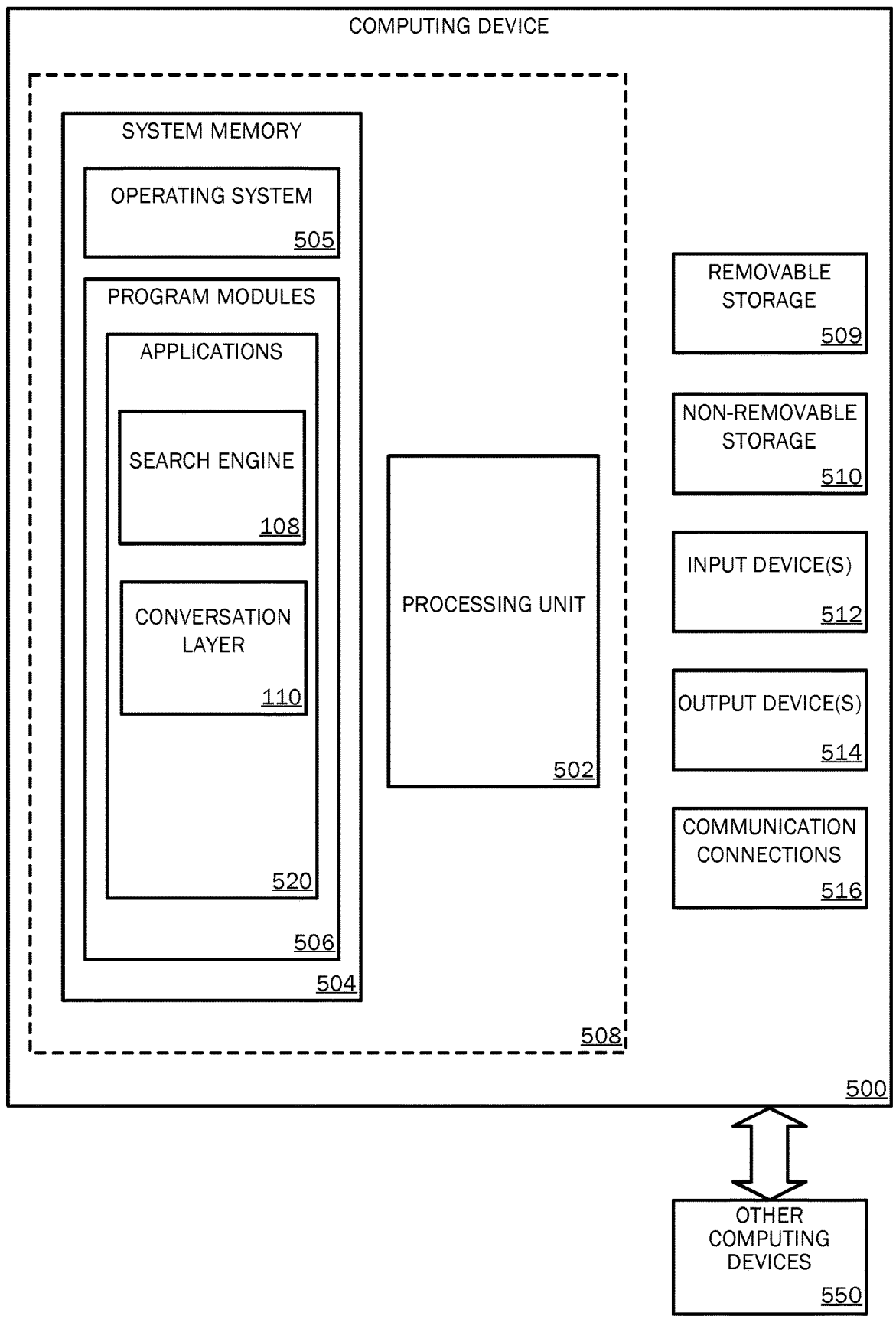
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the search engine 108 and conversation layer 110 of system 100 that can be executed to employ method 400 to respond to a user query as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the search engine 108 and conversation layer 110) may perform processes including, but not limited to, performing method 400 as described herein. For example, the processing unit 502 may implement the system 100, including the search engine 108 and the conversation layer 110. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the system 100 allows a user to perform an online search in one or more of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
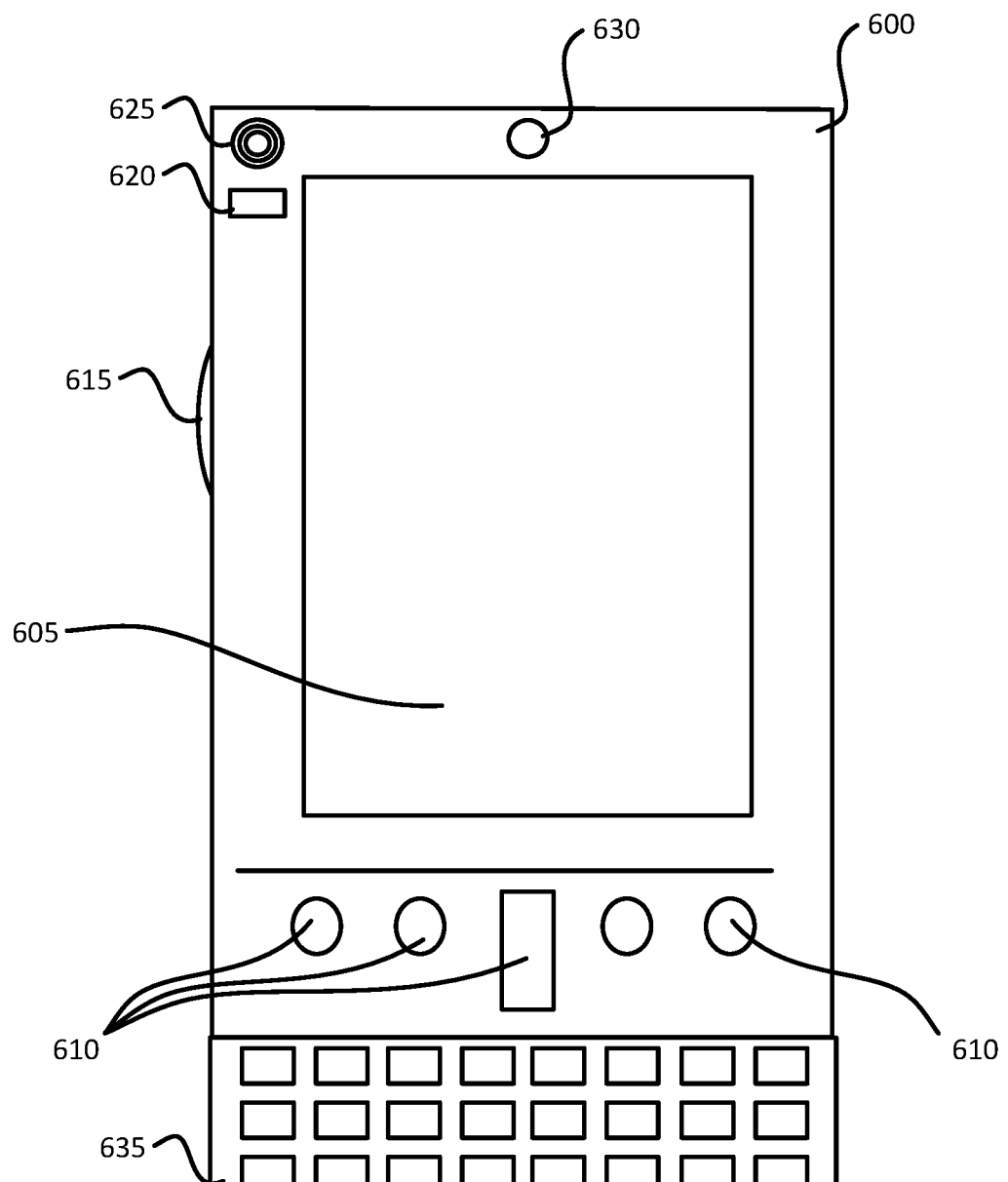
FIG. 6A is a simplified block diagram of a mobile computing device with which various aspects of the disclosure may be practiced.
Figure 6B:
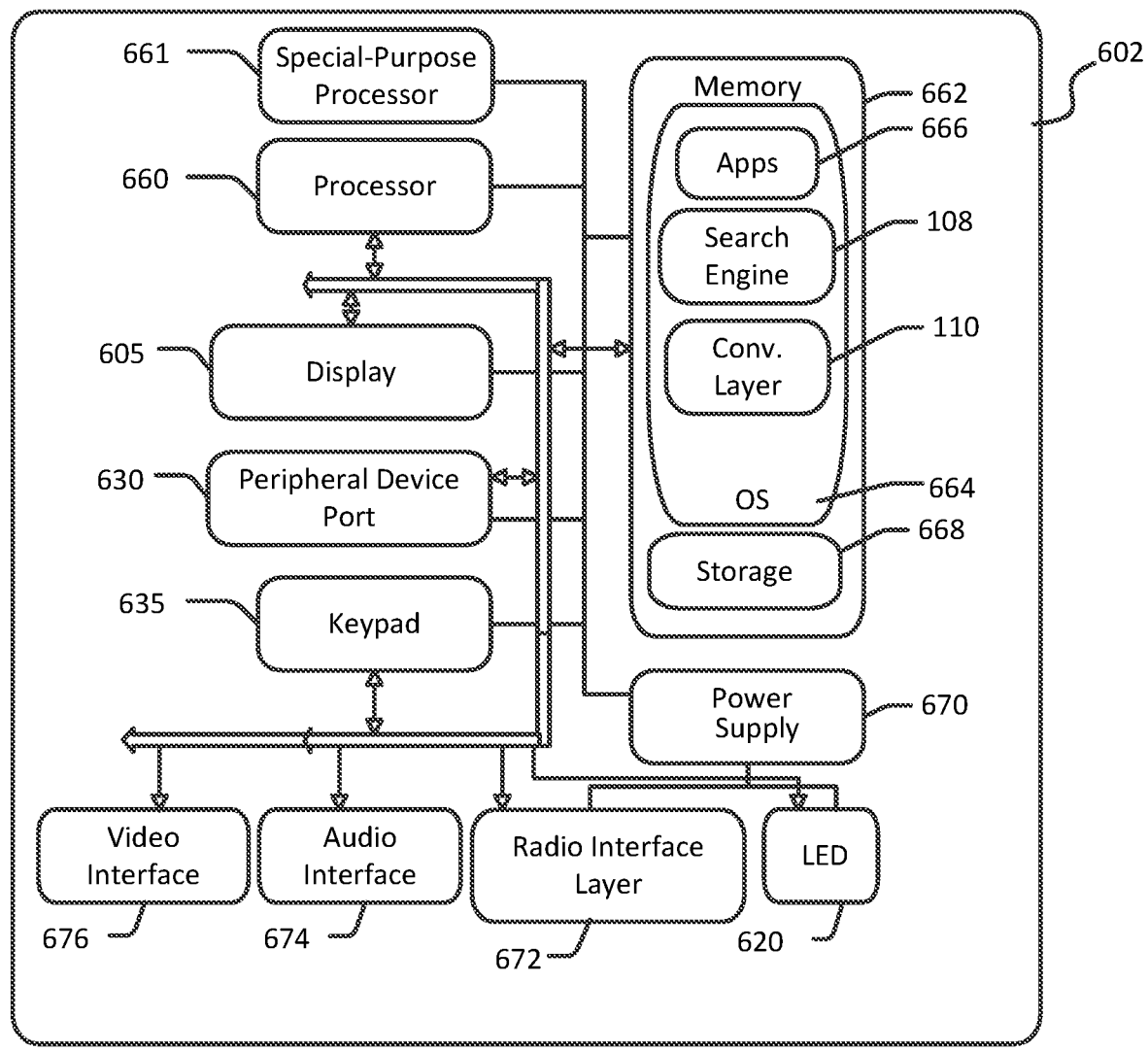
FIG. 6B is a simplified block diagram of the mobile computing device shown in FIG. 10A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the system 100 (including the search engine 108 and conversation layer 110) run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
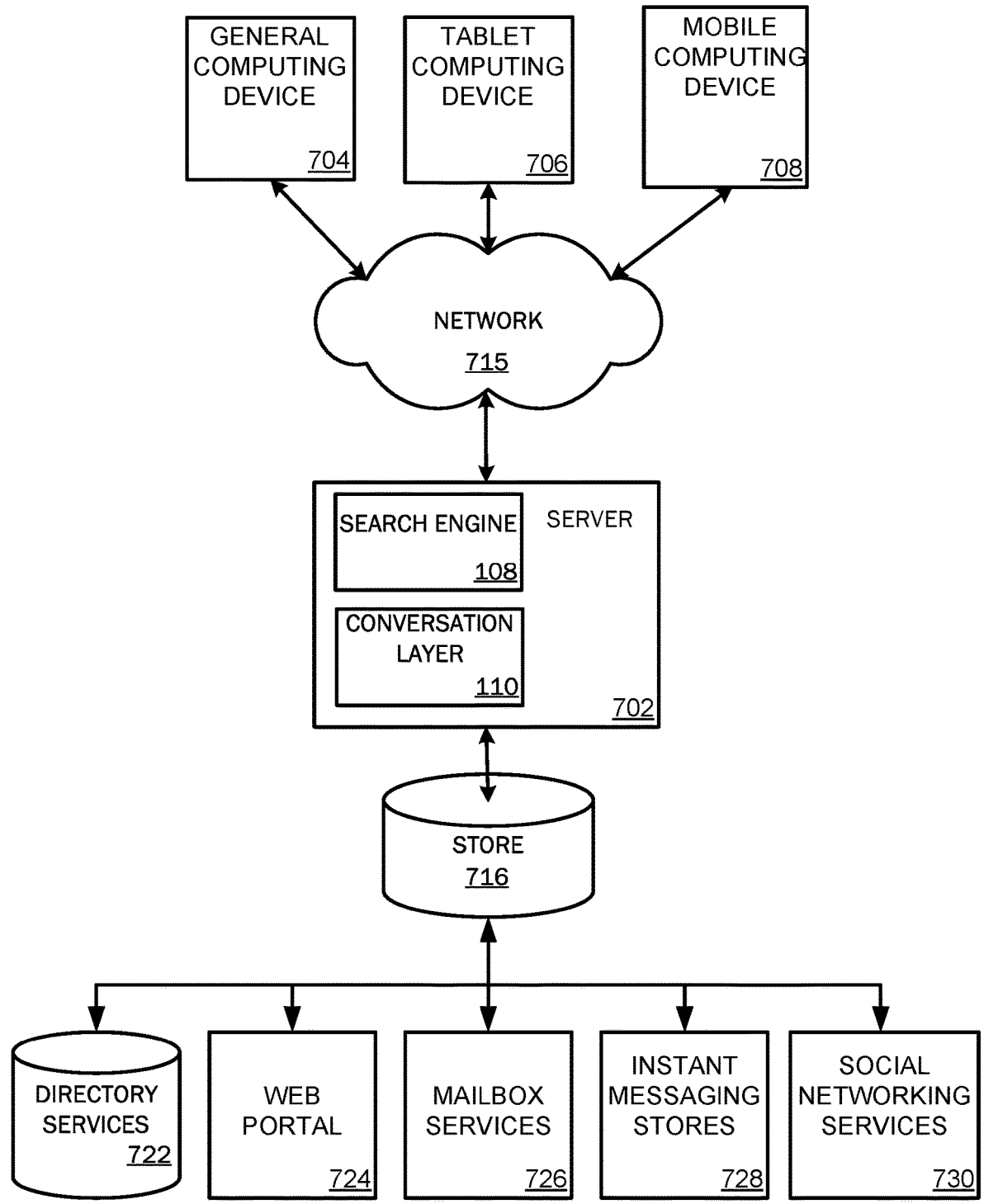
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the system 100 (including the search engine 108 and conversation layer 110) may be implemented in a general computing device 704, a tablet computing device 706 and/or a mobile computing device 708 (e.g., a smart phone). In some aspects, the server 702 is configured to implement a search engine 108 and conversation layer 110, via the network 715 as illustrated in FIG. 7.

Figure 8:
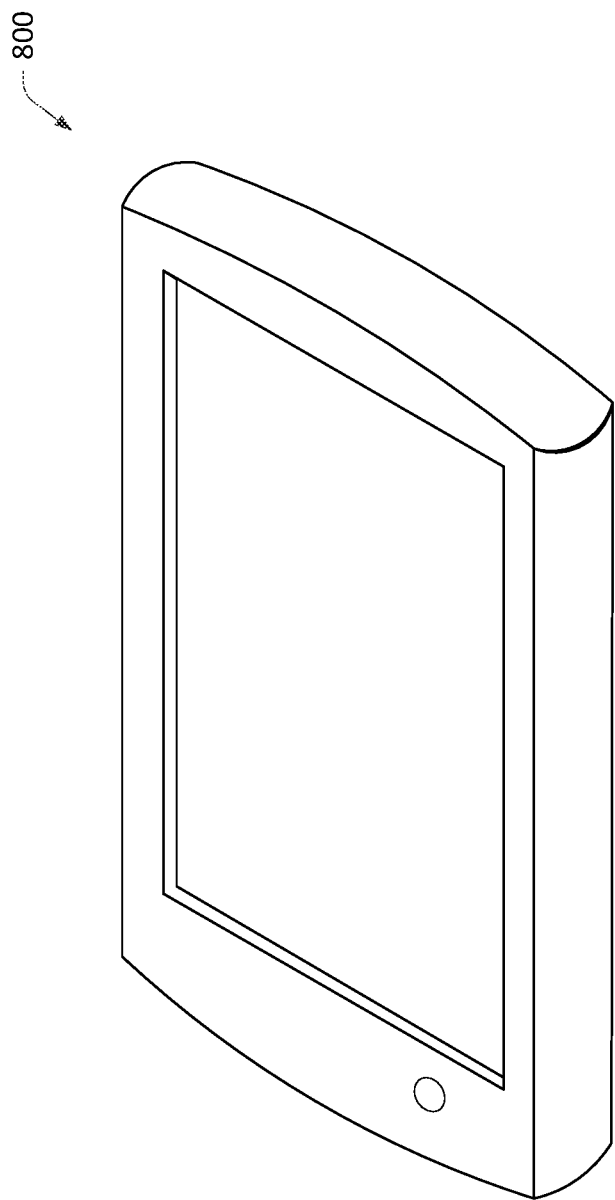
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for responding to an online search query, the system comprising:
   at least one processor; and
   a memory for storing and encoding computer executable instructions that, when executed by the at least one processor is operative to:
      receive a search query;
      in response to the search query, retrieve static search results from a knowledge backend;
      in response to the search query, compare the search query to a chat bot index;
      determine that a relevant chat bot exists based on the comparison of the search query to the chat bot index;
      display a chat bot interface of the relevant chat bot and the static search results in a browser interface;
      receive user chat bot input; and
      deliver the user chat bot input to a chat bot service;
      compare the user chat bot input to an update search threshold; and
      determine whether to update the static search results based on a result of the comparison of the user chat bot input to the update search threshold.

2. The system of claim 1, wherein the at least one processor is further operative to:
   retrieve updated static search results from the knowledge backend based on the user chat bot input when the result is a determination that the user chat bot input breaches the update search threshold; and
   provide the updated search results and the chat bot interface for a combined display in the browser interface in response to the determination.

3. The system of claim 1, wherein the system is a network of servers.

4. The system of claim 1, wherein display a chat bot interface of the relevant chat bot is automatic.

5. The system of claim 1, wherein the at least one processor is further operative to:
   provide at least one generic chat bot based on the comparison of the search query to the chat bot index.

6. The system of claim 1, wherein the comparison of the search query to the chat bot index comprises comparing at least one keyword from the search query to the chat bot index.

7. A system for responding to an online search query, the system comprising:
   at least one processor; and
   a memory for storing and encoding computer executable instructions that, when executed by the at least one processor is operative to:
      receive a search query;
      in response to the search query, retrieve static search results from a knowledge backend;
      in response to the search query, compare the search query to a chat bot index;
      determine that a relevant chat bot exists based on the comparison of the search query to the chat bot index;
      display a chat bot interface of the relevant chat bot and the static search results in a browser interface;
      receive user chat bot input;
      deliver the user chat bot input to a chat bot service;
      compare the user chat bot input to an update related content threshold; and
      determine whether to update displayed related content based on a result of the comparison of the user chat bot input to the update related content threshold.

8. The system of claim 7, wherein the at least one processor is further operative to:
   retrieve updated related content based on the user chat bot input when the result is a determination that the user chat bot input breaches the update related content threshold; and
   provide the updated related content for a combined display in the browser interface with the chat bot interface and the static search results in response to the determination.

9. The system of claim 7, wherein the system includes a search engine on a first server and a conversation layer on a second server.

10. A system for responding to an online search query, the system comprising:
   at least one processor; and
   a memory for storing and encoding computer executable instructions that, when executed by the at least one processor is operative to:
      receive a search query;
      in response to the search query, retrieve static search results from a knowledge backend;
      in response to the search query, compare the search query to a chat bot index;
      determine that a relevant chat bot exists based on the comparison of the search query to the chat bot index;
      display a chat bot interface of the relevant chat bot and the static search results in a browser interface;
      receive user chat bot input;
      deliver the user chat bot input to a chat bot service;
      receive a chat bot response to the user chat bot input;
      compare the chat bot response to an update search threshold; and
      determine whether to update the static search results based on a result of the comparison of the chat bot response to the update search threshold.

11. The system of claim 10, wherein the at least one processor is further operative to:
   retrieve updated static search results from the knowledge backend based on the chat bot response when the result is a determination that the chat bot response breaches the update search threshold; and
   provide the updated search results and the chat bot interface for a combined display in the browser interface in response to the determination.

12. A system for responding to an online search query, the system comprising:
   at least one processor; and
   a memory for storing and encoding computer executable instructions that, when executed by the at least one processor is operative to:
      receive a search query;
      in response to the search query, retrieve static search results from a knowledge backend;
      in response to the search query, compare the search query to a chat bot index;
      determine that a relevant chat bot exists based on the comparison of the search query to the chat bot index;
      display a chat bot interface of the relevant chat bot and the static search results in a browser interface;
      receive user chat bot input;
      deliver the user chat bot input to a chat bot service;
      receive a chat bot response to the user chat bot input;

compare the chat bot response to an update related content threshold; and determine whether to update displayed related content based on a result of the comparison of the chat bot response to the update related content threshold.

13. The system of claim 12, wherein the at least one processor is further operative to:

retrieve updated related content based on the chat bot response when the result is a determination that the chat bot response breaches the update related content threshold; and provide the updated related content for a combined display in the browser interface with the chat bot interface and the static search results in response to the determination.

14. A method for responding to an online search query, the method comprising:

receiving a search query;

in response to the search query, retrieving static search results from a knowledge backend;

in response to the search query, comparing the search query to a chat bot index;

determining that a relevant chat bot exists based on the comparing of the search query to the chat bot index;

in response to the determining that the relevant chat bot exists, selecting an appropriate platform schema for communicating with the relevant chat bot;

displaying a chat bot interface of the relevant chat bot and the static search results in a browser interface;

receiving user chat bot input;

delivering the user chat bot input to a chat bot service;

comparing the user chat bot input to an update search threshold; and determining whether to update the static search results based on a result of the comparison of the user chat bot input to the update search threshold.

15. The method of claim 14, wherein selecting the appropriate platform schema for communicating with the chat bot service comprises:

analyzing the relevant chat bot to determine a platform schema utilized by the relevant chat bot for communication.

16. A system for responding to an online search query, the system comprising:

a computing device including a processing unit and a memory, the processing unit implementing a search engine and a conversation layer, the computing device is operable to:

receive a search query;

in response to the search query, retrieve static search results from a knowledge backend;

in response to the search query, compare the search query to a chat bot index;

determine that a relevant chat bot exists based on the comparison of the search query to the chat bot index;

in response to determining that a relevant chat bot exists, select an appropriate platform schema for communicating with the relevant chat bot;

display a chat bot interface of the relevant chat bot and the static search results in a browser interface;

receive user chat bot input;

deliver the user chat bot input to a chat bot service;

compare the user chat bot input to an update search threshold; and determine whether to update the static search results based on a result of the comparison of the user chat bot input to the update search threshold.

* * * * *